United States Patent
Cho et al.

(10) Patent No.: US 11,424,441 B2
(45) Date of Patent: Aug. 23, 2022

(54) ELECTRODE AND LITHIUM SECONDARY BATTERY COMPRISING SAME

(71) Applicant: LG CHEM, LTD., Seoul (KR)

(72) Inventors: Eunkyung Cho, Daejeon (KR); Yun Kyoung Kim, Daejeon (KR); Kwonnam Sohn, Daejeon (KR); Doo Kyung Yang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 278 days.

(21) Appl. No.: 16/623,844

(22) PCT Filed: Jun. 27, 2018

(86) PCT No.: PCT/KR2018/007263
§ 371 (c)(1),
(2) Date: Dec. 18, 2019

(87) PCT Pub. No.: WO2019/009560
PCT Pub. Date: Jan. 10, 2019

(65) Prior Publication Data
US 2020/0136127 A1    Apr. 30, 2020

(30) Foreign Application Priority Data

Jul. 4, 2017 (KR) .................. 10-2017-0084684
Jun. 26, 2018 (KR) .................. 10-2018-0073277

(51) Int. Cl.
*H01M 4/00* (2006.01)
*H01M 4/134* (2010.01)
(Continued)

(52) U.S. Cl.
CPC ............. *H01M 4/134* (2013.01); *H01M 4/38* (2013.01); *H01M 4/5815* (2013.01);
(Continued)

(58) Field of Classification Search
CPC ...... H01M 4/364; H01M 4/38; H01M 10/052; H01M 4/136; H01M 4/134; Y02E 60/10
See application file for complete search history.

(56) References Cited

U.S. PATENT DOCUMENTS

| 4,086,404 A | 4/1978 | Vissers et al. |
| 2003/0113624 A1* | 6/2003 | Kim ............... H01M 4/581 429/213 |

(Continued)

FOREIGN PATENT DOCUMENTS

| CN | 101453009 A | 6/2009 |
| CN | 102723465 A | 10/2012 |

(Continued)

OTHER PUBLICATIONS

Extended European Search Report, dated May 19, 2020, for European Application No. 18828210.7.

(Continued)

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

An electrode including an additive for forming pores with an average particle diameter of 1 μm or greater, and a lithium secondary battery including the electrode. The porosity of the porous particles may be from 50% to 95%. The porosity of the electrode increases by including the additive for forming pores. As the porosity of the electrode increases by the additive for forming pores, and accordingly, effects of having excellent electrode reactivity and enhanced initial capacity are obtained even under high loading.

9 Claims, 2 Drawing Sheets

(51) Int. Cl.
  *H01M 4/38*   (2006.01)
  *H01M 4/58*   (2010.01)
  *H01M 4/62*   (2006.01)
  *H01M 10/052* (2010.01)
  *H01M 4/02*   (2006.01)

(52) U.S. Cl.
  CPC .......... *H01M 4/622* (2013.01); *H01M 4/625* (2013.01); *H01M 10/052* (2013.01); H01M 2004/021 (2013.01); H01M 2004/028 (2013.01)

(56) References Cited

U.S. PATENT DOCUMENTS

| | | |
|---|---|---|
| 2008/0268338 A1 | 10/2008 | Lee et al. |
| 2009/0053607 A1 | 2/2009 | Jeong et al. |
| 2011/0052998 A1 | 3/2011 | Liang et al. |
| 2011/0059361 A1 | 3/2011 | Wilkening et al. |
| 2011/0177398 A1* | 7/2011 | Affinito ............... H01M 4/134 429/231.95 |
| 2013/0164620 A1 | 6/2013 | Woo et al. |
| 2014/0106259 A1 | 4/2014 | Kwak et al. |
| 2015/0171416 A1* | 6/2015 | Grimminger ......... H01M 4/136 429/233 |
| 2016/0049666 A1* | 2/2016 | Ball ..................... H01M 4/96 429/405 |
| 2016/0164103 A1* | 6/2016 | Son .................. H01M 10/0568 429/199 |
| 2016/0293960 A1 | 10/2016 | Kim |
| 2017/0222448 A1* | 8/2017 | MirTabatabaei .... H01M 10/482 |

FOREIGN PATENT DOCUMENTS

| | | |
|---|---|---|
| CN | 103050704 A | 4/2013 |
| CN | 104659407 A | 5/2015 |
| JP | 10-188957 A | 7/1998 |
| JP | 2003-123726 A | 4/2003 |
| JP | 2004-362859 A | 12/2004 |
| JP | 2011-134691 A | 7/2011 |
| JP | 2011-204571 A | 10/2011 |
| KR | 10-2005-0004996 A | 1/2005 |
| KR | 10-2009-0020933 A | 2/2009 |
| KR | 10-2013-0073766 A | 7/2013 |
| KR | 10-2013-0093740 A | 8/2013 |
| KR | 10-2014-0048738 A | 4/2014 |
| KR | 10-2015-0061874 A | 6/2015 |
| KR | 10-2015-0062393 A | 6/2015 |
| KR | 10-2015-0109240 A | 10/2015 |
| KR | 10-2015-0142832 A | 12/2015 |
| KR | 10-2016-0031293 A | 3/2016 |
| KR | 10-2016-0118597 A | 10/2016 |
| KR | 10-2017-0030136 A | 3/2017 |
| WO | WO 2011/131584 A1 | 10/2011 |
| WO | WO 2017/052246 A1 | 3/2017 |

OTHER PUBLICATIONS

International Search Report for PCT/KR2018/007263 dated Oct. 19, 2018.

Salem et al., "Electrocatalytic polysulfide-traps for controlling redox shuttle process of Li-S battery", Journal of the American Chemical Society, Sep. 2, 2015, vol. 137, No. 36, pp. 11542-11545, total 6 pages.

Chen et al., "Key materials and technology research progress of lithium-sulfur batteries," Energy Storage Science and Technology, vol. 6, No. 2, Mar. 2017, pp. 169-189, with English abstract.

\* cited by examiner

[Figure 1]
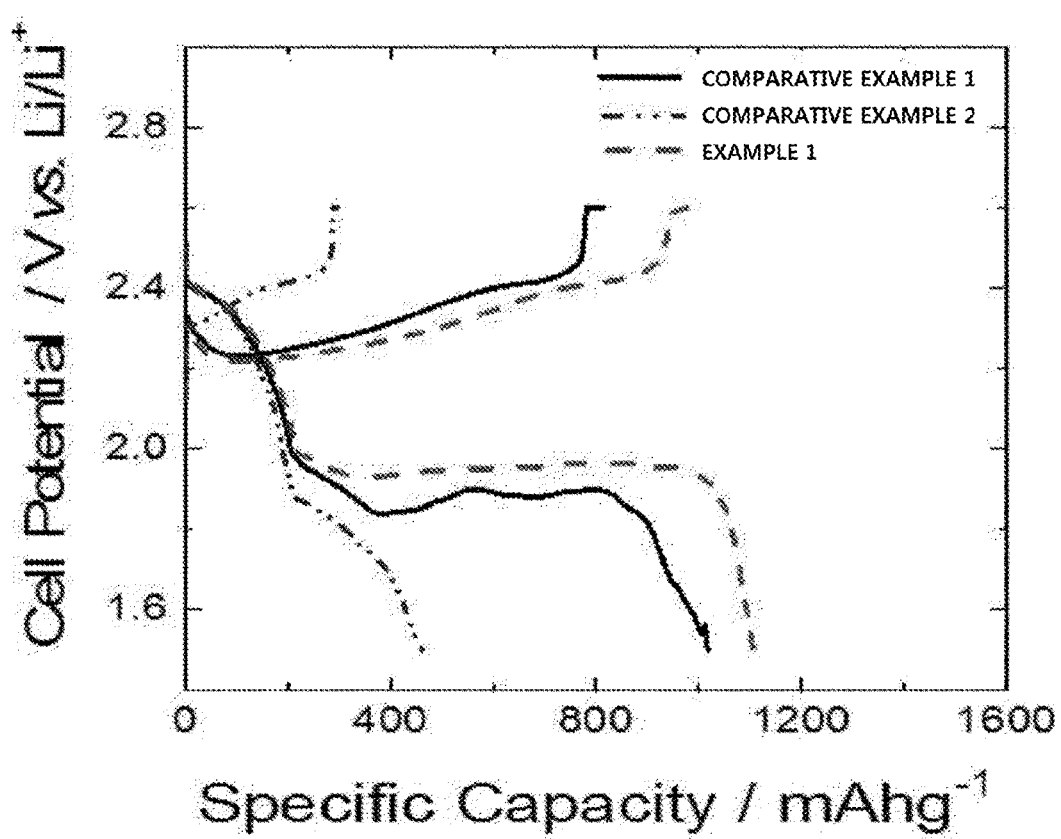

【Figure 2】
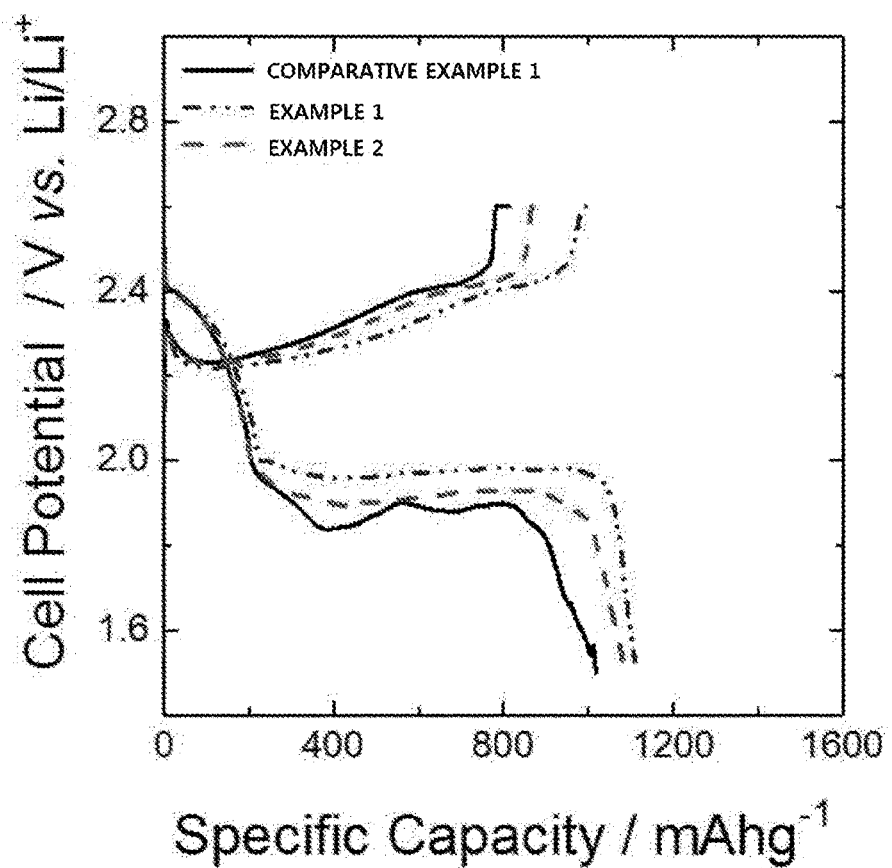

ELECTRODE AND LITHIUM SECONDARY BATTERY COMPRISING SAME

TECHNICAL FIELD

This application claims priority to and the benefits of Korean Patent Application No. 10-2017-0084684, filed with the Korean Intellectual Property Office on Jul. 4, 2017, and Korean Patent Application No. 10-2018-0073277, filed with the Korean Intellectual Property Office on Jun. 26, 2018, the entire contents of which are incorporated herein by reference.

The present invention relates to an electrode for enhancing capacity and reactivity of a lithium secondary battery, and a lithium secondary battery comprising the same.

BACKGROUND ART

Until recently, there have been considerable interests in developing high energy density batteries using lithium as a negative electrode. For example, compared to other electrochemical systems having a lithium-inserted carbon electrode and a nickel or cadmium electrode reducing battery energy density by increasing a weight and a volume of a negative electrode with the presence of non-electroactive materials, lithium metal has low weight and high capacity properties, and therefore, has attracted much attention as a negative electrode active material of an electrochemical battery. A lithium metal negative electrode, or a negative electrode including mainly lithium metal provides an opportunity to form batteries that are lighter and have higher energy density compared to batteries such as lithium-ion, nickel metal hydride or nickel-cadmium batteries. Such characteristics are highly preferred with batteries for portable electronic devices such as mobile phones and lap-top computers wherein premiums are paid in low weights.

Such types of positive electrode active materials for a lithium battery are known, and these include a sulfur-containing positive electrode active material including sulfur-sulfur bonds. High energy capacity and rechargeability are achieved from electrochemical cleavage (reduction) and reforming (oxidation) of the sulfur-sulfur bonds.

A lithium-sulfur battery using lithium and alkali metals as a negative electrode active material and sulfur as a positive electrode active material as described above has theoretical energy density of 2,800 Wh/kg. Sulfur has theoretical capacity of 1,675 mAh/g, which is far superior than other battery systems, and has received attention in portable electronic devices with advantages of being inexpensive due to being abundant in resources and being an environmental-friendly material.

However, sulfur used as a positive electrode active material of a lithium-sulfur battery is a nonconductor, and therefore, has had problems in that migration of electrons produced from an electrochemical reaction is difficult, polysulfide ($Li_2S_8$ to $Li_2S_4$) elution occurs during a charge and discharge process, and battery lifetime properties and rate properties decline due to low kinetic of an electrochemical reaction caused by low electrical conductivity of sulfur and lithium sulfide ($Li_2S_2/Li_2S$).

In this regard, studies on obtaining a high performance lithium-sulfur battery by enhancing kinetic of an redox reaction of sulfur during a charge and discharge process of the lithium-sulfur battery using platinum (Pt) that has been much used as an electrochemical catalyst have been recently reported (Hesham Al Salem et al.: "Polysulfide Traps for Controlling Redox Shuttle Process of Li—S Batteries": J.Am.Chem.Soc., 2015, 137, 11542).

However, noble metal catalysts such as platinum are expensive and are difficult to commercialize thereby, and, in addition thereto, have a problem to be used as a positive electrode material of a lithium-sulfur battery due to the possibility of poisoning caused by a redox reaction of sulfur during a charge and discharge process.

As described above, enhancing performance of a lithium-sulfur battery using a catalyst has had limits. In view of the above, development of technologies capable of enhancing performance of batteries including a lithium-sulfur battery in other ways such as an electrode form change has been required.

PRIOR ART DOCUMENTS

Patent Documents

Korean Patent Application Laid-Open Publication No. 2015-0142832, "Positive electrode composition lithium-sulfur battery, positive electrode for lithium-sulfur battery including the same, and method for preparing the same"

Korean Patent Application Laid-Open Publication No. 2016-0118597, "All solid-state lithium-sulfur secondary battery positive electrode using graphene oxide, and method for preparing the same"

DISCLOSURE

Technical Problem

As a result of extensive studies in view of the above, the inventors of the present invention have identified that, when preparing an electrode by additionally adding micro-sized carbon material porous particles in addition to an electrode active material, a binder and a conductor, porosity of the electrode increases, and electrode reactivity and initial capacity are enhanced thereby even under high loading.

Accordingly, an aspect of the present invention provides an electrode having enhanced porosity.

Another aspect of the present invention provides a lithium secondary battery including such an electrode having enhanced porosity.

Technical Solution

According to an aspect of the present invention, there is provided an electrode comprising an additive for forming pores, which is porous particles having an average particle diameter (D50) of 1 μm or greater.

Porosity of the porous particles may be from 50% to 95%.

The additive for forming pores may comprise carbon or graphite.

A content of the additive for forming pores may be from 0.5% by weight to 5% by weight based on a total weight of the electrode.

The electrode may have porosity of 64% or greater.

The electrode may comprise an electrode active material, a binder, a conductor, and the additive for forming pores.

The electrode active material may be one or more types selected from the group consisting of elemental sulfur ($S_8$), sulfur series compounds or mixtures thereof.

The binder may be one or more types selected from the group consisting of styrene-butadiene rubber-carboxymethyl cellulose (SBR-CMC), poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride, poly(ethyl acrylate), polytetrafluoroethylene, polyvinyl chloride, polyacrylonitrile, polyvinylpyridine, polystyrene, derivatives thereof, blends thereof and copolymers thereof.

The conductor may be one or more types selected from the group consisting of carbon-based materials selected from among carbon black, acetylene black and ketjen black; and conducting polymers selected from among polyaniline, polythiophene, polyacetylene and polypyrrole.

According to another aspect of the present invention, there is provided a lithium secondary battery including the electrode.

Advantageous Effects

According to the present invention, porosity of an electrode increases by an additive for forming pores, and accordingly, effects of having excellent electrode reactivity and enhanced initial capacity are obtained even under high loading.

In addition, when using the electrode having increased porosity by the additive for forming pores of the present invention as a positive electrode of a lithium-sulfur battery, a sufficient amount of an electrolyte liquid is loaded inside the pores included in the positive electrode, which efficiently removes polysulfide, a discharge product of the lithium-sulfur battery, and as a result, lifetime properties of a lithium secondary battery including the lithium-sulfur battery can be enhanced.

DESCRIPTION OF DRAWINGS

FIG. 1 is a graph presenting results of charge and discharge experiments on lithium-sulfur batteries manufactured in Example 1 and Comparative Examples 1 and 2 of the present invention.

FIG. 2 is a graph presenting results of charge and discharge experiments on lithium-sulfur batteries manufactured in Examples 1 and 2 and Comparative Example 1.

BEST MODE

Hereinafter, the present invention will be described in more detail in order to illuminate the present invention.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

Electrode

The present invention relates to an electrode having excellent electrode reactivity and high initial capacity even under high loading.

The electrode of the present invention comprises an additive for forming pores having an average particle diameter (D50) of 1 μm or greater.

The shape of the additive for forming pores is not particularly limited, however, the average particle diameter (D50) may be 1 μm or greater, and preferably from 1 μm to 20 μm. When the average particle diameter is less than the above-mentioned range, the rate of electrode porosity increase is insignificant, and effects of enhancing electrode reactivity and initial capacity may not be expected under high loading, and particularly, when used as a positive electrode of a lithium-sulfur battery, removal efficiency of polysulfide, a discharge product, decreases, which may decline battery lifetime properties. When the average particle diameter is greater than the above-mentioned range, particle sizes are excessively large, which is not proper as an additive for an electrode.

The additive for forming pores may have particle inner porosity of 50% to 95%, preferably 50% to 90%, and more preferably 50% to 85%, and since the additive for forming pores itself includes pores, electrode porosity may be enhanced by the pores included in the additive for forming pores when used in the electrode.

When porosity of the pores is less than the above-mentioned range, the rate of porosity increase of the electrode is insignificant, and effects of enhancing electrode reactivity and initial capacity may not be expected, and particularly, when used as a positive electrode of a lithium-sulfur battery, removal efficiency of polysulfide, a discharge product, decreases, which may decline battery lifetime properties. When the porosity is greater than the above-mentioned range, durability of the electrode may decrease.

The additive for forming pores may be porous carbon or graphite.

A content of the additive for forming pores may be from 0.5% by weight to 10% by weight, preferably from 1% by weight to 10% by weight, and more preferably from 1.5% by weight to 10% by weight based on a total weight of the electrode. When the content is less than the above-mentioned range, the rate of porosity increase of the electrode is insignificant, and effects of enhancing electrode reactivity and initial capacity may not be expected, and particularly, when used as a positive electrode of a lithium-sulfur battery, removal efficiency of polysulfide, a discharge product, decreases, which may decline battery lifetime properties. When the content is greater than the above-mentioned range, electrode porosity excessively increases declining durability of the electrode.

The additive for forming pores may be prepared using methods preparing porous carbon products known in the art, and for example, the additive for forming pores may be prepared into a porous carbon product form using a method comprising the following (S1) to (S5).

(S1) providing a mold of an inorganic molding material including interconnected pores;

(S2) providing a carbon precursor material;

(S3) infiltrating the pores of the mold with the precursor material;

(S4) carbonizing the precursor material; and (S5) forming a porous carbon product by removing the mold.

Herein, in (S1), the molding material may be $SiO_2$.

In addition, in (S2), the carbon precursor material may be a pitch, and particularly, a "mesophase pitch" may be a carbonaceous material having a regular liquid crystal structure.

The method of removing the mold in (S5) may occur by chemical dissociation, and herein, the formed porous carbon product may be the additive for forming pores according to the present invention.

In addition, the electrode may further comprise, a conductor for electrons to smoothly migrate in the electrode, and a binder, together with an electrode active material.

The electrode active material may include positive electrode active materials or negative electrode active materials used in batteries without limit.

For example, when the electrode active material is a positive electrode active material for a lithium-sulfur battery, the positive electrode active material may include elemental sulfur (S8), sulfur series compounds or mixtures thereof. Specifically, the sulfur series compound may be $Li_2S_n$ (n≥1), an organosulfur compound, a carbon-sulfur polymer (($C_2S_x)_n$: x=2.5 to 50, n≥2) or the like.

In addition, the conductor may be a carbon-based material such as carbon black, acetylene black or ketjen black; or a conducting polymer such as polyaniline, polythiophene, polyacetylene or polypyrrole, and the conductor may be included in a range of 5% by weight to 20% by weight, preferably 5% by weight to 15% by weight, and more preferably 5% by weight to 10% by weight based on a total weight of the electrode. When the conductor content is less than the above-mentioned range, an effect of enhancing conductivity obtained by the use of the conductor is insignificant, and when the content is greater than the above-mentioned range, the electrode active material content relatively decreases causing concern of declining capacity properties.

In addition, as the binder, poly(vinyl acetate), polyvinyl alcohol, polyethylene oxide, polyvinyl pyrrolidone, alkylated polyethylene oxide, crosslinked polyethylene oxide, polyvinyl ether, poly(methyl methacrylate), polyvinylidene fluoride, a copolymer of polyhexafluoropropylene and polyvinylidene fluoride (product name: Kynar), poly(ethyl acrylate), polytetrafluoroethylene, polyvinyl chloride, polyacrylonitrile, polyvinylpyridine, polystyrene, derivatives, blends and copolymers thereof, and the like may be used. In addition, the binder may be included in a range of 5% by weight to 20% by weight, preferably 5% by weight to 15% by weight, and more preferably 5% by weight to 10% by weight based on a total weight of the electrode. When the binder content is less than the above-mentioned range, an effect of improving binding strength between the electrode active materials or between the electrode active material and a current collector obtained by the use of the binder is insignificant, and when the content is greater than the above-mentioned range, the electrode active material content relatively decreases causing concern of declining capacity properties.

Such an electrode may be prepared using common methods, and specifically, may be prepared by coating a composition for forming an electrode active material layer, which is prepared by mixing the electrode active material, the conductor and the binder in an organic solvent, on an electrode current collector, and drying and selectively rolling the result. Herein, the composition for forming pores may be mixed in the organic solvent together with the electrode active material, the conductor and the binder.

Herein, as the organic solvent, those capable of uniformly dispersing the positive electrode active material, the binder and the conductor, and being readily evaporated are preferably used. Specific examples thereof may include N-methyl-2-pyrrolidone (NMP), acetonitrile, methanol, ethanol, tetrahydrofuran, water, isopropyl alcohol and the like.

The electrode comprising the additive for forming pores according to the present invention may have porosity 50% or greater, preferably 55% or greater, and more preferably 64% or greater. Alternatively, the porosity may be from 64% to 80%.

When the electrode porosity is less than the above-mentioned range, effects of enhancing electrode reactivity and initial capacity are insignificant, and when the electrode porosity is greater than the above-mentioned range, durability of the electrode may decrease.

Lithium Secondary Battery

The present invention also relates to a lithium secondary battery comprising the electrode that comprised the additive for forming pores as described above.

The electrode may be used in both a positive electrode or a negative electrode of a lithium secondary battery, and, being used as a positive electrode of a lithium-sulfur battery is particularly advantageous in enhancing battery lifetime properties since an effect of removing polysulfide, a discharge product, is obtained.

Specifically, the additive for forming pores includes pores so as to have porosity of 50% to 95%, and therefore, an electrolyte liquid is loaded into the pores, and polysulfide may be removed by the electrolyte liquid in the pores.

The present invention also relates to an electrode comprising a pore forming agent selected from the group consisting of a monomer of a depolymerization reactive polymer (unzipping polymer), a plasticizer, an organic mold and a mixture thereof.

By being included in the active material layer of the electrode, the pore forming agent may enhance electrode porosity by forming pores while generating a gas through a chemical reaction.

By being used in a lithium secondary battery, particularly, a lithium sulfur-battery, the electrode may enhance lifetime properties of the lithium-sulfur battery by exhibiting a buffer action with respect to charge and discharge-dependent changes in the volume of the active material.

In a lithium-sulfur battery, active materials in an electrode contract and expand as charge and discharge progress. Therefore, the present invention is to exhibit a buffer action with respect to changes in the volume of the active material and an effect of electrolyte liquid loading by introducing the pore forming agent as described above to the electrode.

Specifically, the electrode comprises a current collector; and an active material layer formed on the current collector and comprising an active material, and the active material layer may include an active material using S and C; and a pore forming agent selected from the group consisting of a monomer of a depolymerization reactive polymer (unzipping polymer), a plasticizer, an organic mold and a mixture thereof. The active material layer may further include general additives of an active material layer such as a binder and a conductor.

The pore forming agent is preferably included in the active material layer in a content of 10% by weight or less, and may be included in a content of preferably 0.1% by weight to 5% by weight, and more preferably 0.1% by weight to 2% by weight.

In addition, the active material layer may have mixture density of 0.8 g/cc to 2.0 g/cc, preferably 0.9 g/cc to 1.6 g/cc, and more preferably 1.19 g/cc to 1.3 g/cc. The mixture density of the active material layer being less than the above-mentioned range is not preferred due to a capacity decrease per volume, and the mixture density being greater than the above-mentioned range is not preferred since volume expansion of the active material layer increases.

The electrode for a lithium-sulfur battery including the active material layer as above may be prepared using a method for preparing an electrode for a lithium-sulfur battery including preparing a composition for forming an active material layer including an active material and an additive for forming pores, and forming an active material layer by coating the composition for forming an active material layer on a current collector, and then drying or heat treating the result.

In addition, sizes, shapes and porosity of the pores formed in the active material layer may be controlled depending on sizes, shapes and a content of the additive for forming pores used for forming the active material layer, and preferably, the active material layer may have porosity of greater than 50% by volume and less than or equal to 70% by volume, preferably 55% by volume to 70% by volume, and more preferably 60% by volume to 70% by volume.

The porosity inside the active material layer being less than the above-mentioned range is not preferred since a buffer action with respect to changes in the volume of the active material is insignificant, and the porosity being greater than the above-mentioned range is not preferred since disadvantages of decreasing electrode conductivity and decreasing capacity per volume occur.

A lithium secondary battery including the electrode including such an additive for forming pores exhibits a buffer action with respect to charge and discharge-dependent changes in the volume of the active material due to porosity enhancement, and may enhance lifetime properties of the lithium secondary battery.

Hereinafter, preferred examples are provided in order to illuminate the present invention, however, the following examples are for illustrative purposes only, and it is obvious to those skilled in the art that various modifications and changes may be made within the scope of the category and technological ideas of the present invention, and such modifications and changes also belong to the attached claims.

Preparation Example 1: Synthesis of Additive for Forming Pores

A pitch was infiltrated as carbon precursor material to pores of a non-spherical $SiO_2$ mold including interconnected pores, and then the pitch was carbonized at a temperature of 700° C. to form a porous composite.

After that, the porous composite was loaded into a hydrofluoric acid bath to remove the $SiO_2$ mold, and as a result, an additive for forming pores in a porous carbon product form was synthesized.

The synthesized porous carbon product had porosity of 50% or greater, and had an average particle diameter (D50) of 4 μm.

Example 1: Manufacture of Positive Electrode and Lithium-Sulfur Battery Comprising the Same A sulfur-carbon composite that is a positive electrode active material was prepared in a ratio of 7:3, and after preparing positive electrode slurry by adding a positive electrode mixture including the sulfur-carbon composite in 88% by weight, carbon black that is a conductor in 5% by weight, styrene-butadiene rubber-carboxymethyl cellulose (SBR-CMC) that is a binder in 5% by weight and the additive for forming pores of Preparation Example 1 in 2% by weight to water that is a solvent, the positive electrode slurry was coated on an aluminum foil current collector, and a positive electrode was prepared with loading of 5 mAh/$cm^2$.

A lithium-sulfur battery was manufactured using lithium foil having a thickness of 200 μm as a negative electrode, an organic solution dissolving 2% by weight of a $LiNO_3$ additive in 1 M LiTFSI (DME/DOL, 1:1 volume ratio) as an electrolyte liquid, and a polypropylene film as a separator.

LiTFSI: bis(trifluoromethane) sulfonamide lithium salt
DME: dimethoxymethane
DOL: 1,3-dioxolane Example 2: Manufacture of Positive Electrode and Lithium-Sulfur Battery Including the Same A sulfur-carbon composite that is a positive electrode active material was prepared in a ratio of 7:3, and after preparing positive electrode slurry by adding a positive electrode mixture including the sulfur-carbon composite in 88% by weight, carbon black that is a conductor in 5% by weight, styrene-butadiene rubber-carboxymethyl cellulose (SBR-CMC) that is a binder in 5% by weight and the additive for forming pores of Preparation Example 1 in 5% by weight to water that is a solvent, the positive electrode slurry was coated on an aluminum foil current collector, and a positive electrode was prepared with loading of 5 mAh/$cm^2$.

A lithium-sulfur battery was manufactured using lithium foil having a thickness of 200 μm as a negative electrode, an organic solution dissolving 2% by weight of a $LiNO_3$ additive in 1 M LiTFSI (DME/DOL, 1:1 volume ratio) as an electrolyte liquid, and a polypropylene film as a separator.

LiTFSI: bis(trifluoromethane) sulfonamide lithium salt
DME: dimethoxymethane
DOL: 1,3-dioxolane Comparative Example 1

A positive electrode and a lithium-sulfur battery were manufactured in the same manner as in Example 1 except that the additive for forming pores was not used.

Comparative Example 2

A positive electrode and a lithium-sulfur battery were manufactured in the same manner as in Example 1, except that porous carbon having an average particle diameter (D50) of less than 1 μm was used instead of the additive for forming pores, however, the effect of enhancing electrode porosity was not obtained due to an insufficient pore size.

TABLE 1

| Unit: % by Weight | Positive Electrode Active Material Sulfur | Conductor Carbon Black | Binder SBR-CMC | Additive for Forming Pores Preparation Example 1 | Porous Carbon |
|---|---|---|---|---|---|
| Example 1 | 88 | 5 | 5 | 2 | 0 |
| Example 2 | 85 | 5 | 5 | 5 | 0 |
| Comparative Example 1 | 90 | 5 | 5 | 0 | 0 |
| Comparative Example 2 | 88 | 5 | 5 | 0 | 2 |

Experimental Example 1

For each of the positive electrodes prepared in Example 1 and Comparative Example 1, porosity was measured, and as a result, it was seen that porosity of Example 1 that is a positive electrode including the additive for forming pores was enhanced to 64% while porosity of Comparative Example 1 that is a positive electrode that did not include the additive for forming pores was 56%.

Experimental Example 2

For the lithium-sulfur batteries of Examples 1 and 2 and Comparative Examples 1 and 2, charge and discharge experiments were performed.

FIG. 1 is a graph presenting the results of charge and discharge experiments on the lithium-sulfur batteries manufactured in Example 1 of the present invention and Comparative Examples 1 and 2, and FIG. 2 is a graph presenting the results of charge and discharge experiments on the lithium-sulfur batteries manufactured in Examples 1 and 2 and Comparative Example 1.

Based on FIGS. 1 and 2, it was seen that, when performing charge and discharge experiments under a condition of 0.1 C in a voltage range of 1.5 V to 2.8 V, and observing the experimental results at the 1 cycle, the lithium-sulfur batteries of Examples 1 and 2 had enhanced Coulombic efficiency, initial discharge capacity and cyclability by the positive electrode having enhanced porosity.

Hereinbefore, the present invention has been described with reference to limited examples and drawings, however, the present invention is not limited thereto, and by those skilled in the art, various changes and modifications may be made within technological ideas of the present invention and the range of equivalents of the attached claims.

The invention claimed is:

1. A positive electrode for a lithium secondary battery, comprising:
   a positive electrode active material;
   a binder;
   a conductor; and
   an additive for forming pores,
   wherein the additive comprises porous particles having an average particle diameter (D50) of 4 µm or greater, and wherein the additive is configured to form pores in the positive electrode, and
   wherein the additive configured to form pores comprises carbon or graphite.

2. The positive electrode of claim 1, wherein a porosity of the porous particles is from 50% to 95%.

3. The positive electrode of claim 1, wherein a content of the additive configured to form pores is from 0.5% by weight to 5% by weight with respect to a total weight of the electrode.

4. The positive electrode of claim 1, wherein the electrode has a porosity of 64% or greater.

5. The positive electrode of claim 1, wherein the electrode active material is one or more positive electrode active materials selected from the group consisting of elemental sulfur (S8), a sulfur series compound and a mixture thereof.

6. The positive electrode of claim 1, wherein the binder is one or more selected from the group consisting of styrene-butadiene rubber-carboxymethyl cellulose (SBR-CMC), poly(vinyl acetate), polyvinyl alcohol, polyethylene oxide, polyvinyl pyrrolidone, alkylated polyethylene oxide, cross-linked polyethylene oxide, polyvinyl ether, poly(methyl methacrylate), polyvinylidene fluoride, a copolymer of polyhexafluoropropylene and polyvinylidene fluoride, poly(ethyl acrylate), polytetrafluoroethylene, polyvinyl chloride, polyacrylonitrile, polyvinylpyridine, polystyrene, derivatives thereof, blends thereof and copolymers thereof.

7. The positive electrode of claim 1, wherein the conductor is one or more selected from the group consisting of carbon-based materials selected from carbon black, acetylene black and ketjen black; and conducting polymers selected from polyaniline, polythiophene, polyacetylene and polypyrrole.

8. A lithium secondary battery comprising the positive electrode of claim 1.

9. The lithium secondary battery of claim 8, wherein the lithium secondary battery is a lithium-sulfur battery.

* * * * *